Nov. 29, 1938.  W. M. RYAN ET AL  2,138,356
WEIGHING AND FILLING APPARATUS AND METHOD
Filed Oct. 1, 1935  4 Sheets-Sheet 1

INVENTORS
WILLIAM MILES RYAN.
JOHN W. BOLD.
BY
ATTORNEYS

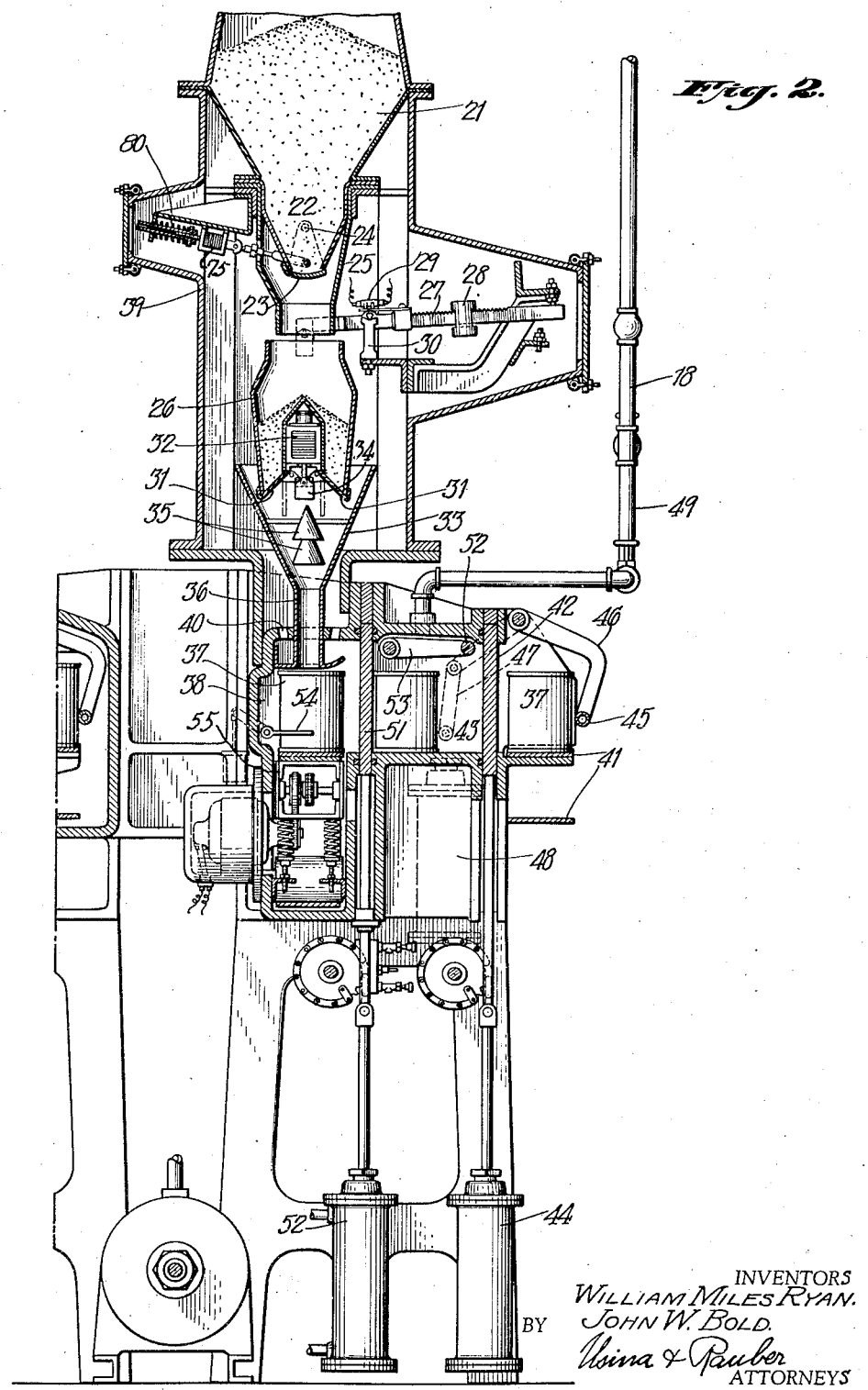

Nov. 29, 1938.    W. M. RYAN ET AL    2,138,356
WEIGHING AND FILLING APPARATUS AND METHOD
Filed Oct. 1, 1935    4 Sheets-Sheet 3
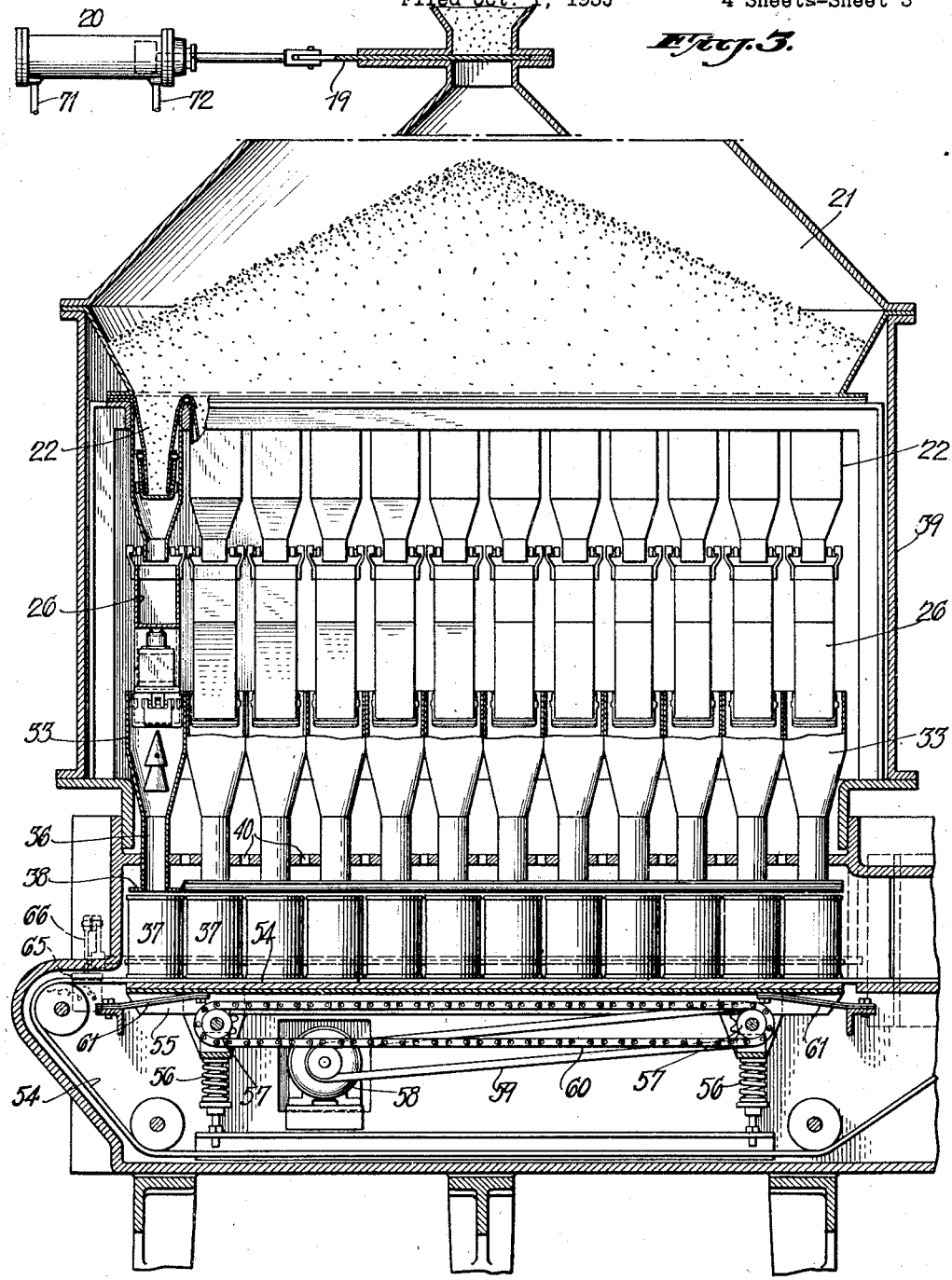
INVENTORS
WILLIAM MILES RYAN.
JOHN W BOLD.
BY
Uima & Pauber ATTORNEYS

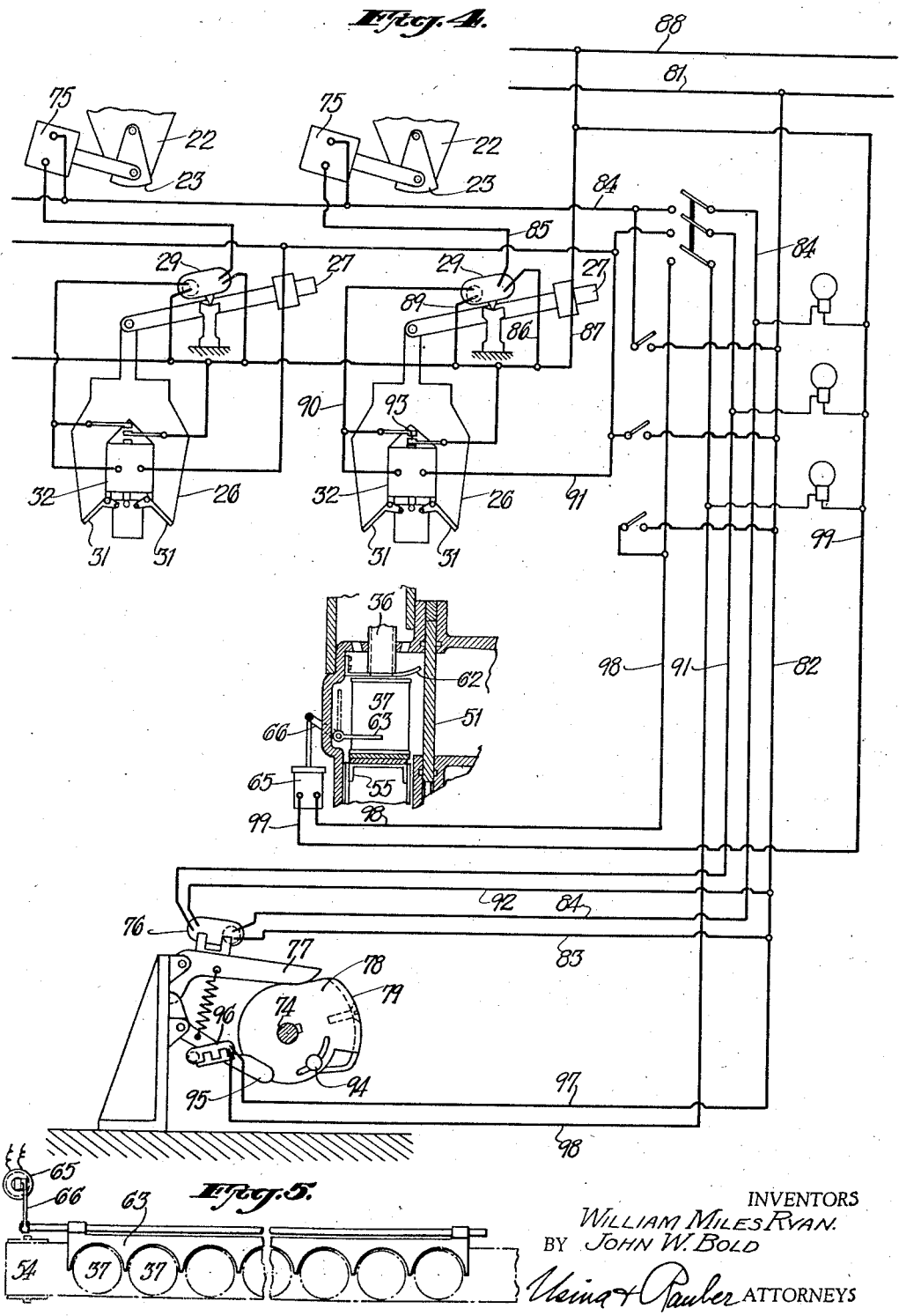

Patented Nov. 29, 1938

2,138,356

UNITED STATES PATENT OFFICE 2,138,356

WEIGHING AND FILLING APPARATUS AND METHOD

William Miles Ryan and John W. Bold, Brooklyn, N. Y., assignors to Ryan Coffee Corporation, Brooklyn, N. Y., a corporation of New York Application October 1, 1935, Serial No. 42,990

17 Claims. (Cl. 226—68)

Our invention relates to an apparatus and method for enclosing a quantity or quantities of solid material in a selected gas atmosphere with the exclusion of air, or in vacuum, and for weighing the material and filling it into containers in the selected atmosphere or vacuum.

Heretofore when materials have been packed in a selected gas, such as carbon dioxide or nitrogen, they have been weighed into containers, such as cans or jars, the air withdrawn from the individual containers to a limited extent and the upper surface of the material in the container brought into contact with the selected gas, and then sealed. Or, if they were to be sealed in vacuum, they were sealed before, or without, contact with the selected gas. The withdrawal of the air, or vacuumizing the contents of the containers, was necessarily a slow process because if the filled containers were subjected instantly to vacuum, the outrush of air would blow the material from the containers. It was, therefore, difficult or impossible to withdraw all or the major part of the air in the limited time available in commercial operation, and to replace this air entirely with the selected gas when gas packing was desired.

In our present invention the solid materials to be packaged or packed under a selected gas atmosphere or under vacuum are vacuumized and enclosed and permeated with the selected gas before filling into the containers. The air is also withdrawn from the containers and replaced with the selected gas. The material is then weighed into separate quantities which are filled into the containers while both are enclosed in or filled with the selected gas. The filled containers may then be sealed while still enclosed in the selected gas. When a selected gas is used, it may be at atmospheric pressure, or at pressures below or above atmospheric. The movement of the material in weighing and in filling the containers serves to agitate it and mix it thoroughly with the selected gas as contrasted with processes in which the gas comes only into contact with a limited area of the material.

In our invention also the material may be freed from air and thoroughly mixed with the selected gas in quantity and a number of quantities may be weighted at the same time and filled simultaneously into a corresponding number of containers arranged in a suitable group, which may then be moved to the sealing or capping machine and replaced by a subsequent group. In this way the time required for replacing the air with vacuum or a selected gas may be made as long as desired without decreasing the number of containers thus treated in a given time and thus without reducing the capacity of the apparatus. The vacuumizing and replacing with selected gas may be repeated, if desired, to wash out any remaining traces of air.

The various features of the invention are illustrated in the accompanying drawings, in which:

Fig. 2 is a vertical section on an enlarged scale on the line 2—2 of Fig. 1, showing the lower part of the apparatus.

Fig. 3 is a vertical section taken at right angles to that of Fig. 2, showing the weighing and filling apparatus.

Fig. 4 is a wiring diagram showing the electrical control for the various parts of the weighing and filling apparatus, and Fig. 5 is a plan view of a portion of a container positioning and holding element of the apparatus.

Figure 1:
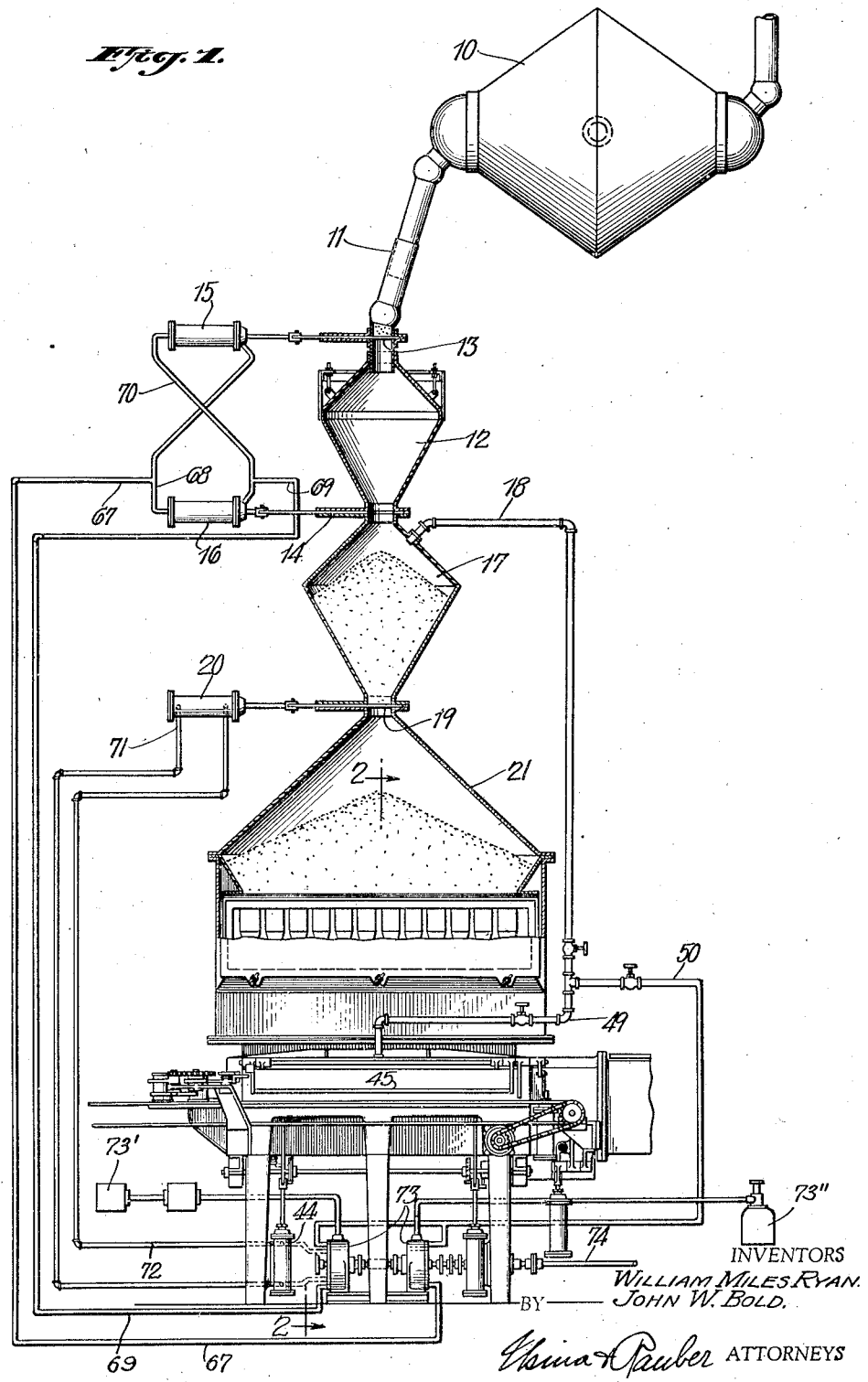
Fig. 1 is a side elevation of apparatus embodying a preferred form of the invention, parts being broken away to show the interior construction.

In the apparatus shown in the accompanying drawings the invention is shown, by way of example, embodying certain parts of a weighing machine disclosed in our co-pending application Serial No. 740,738 filed August 21, 1934, and of apparatus shown in our co-pending application Serial No. 740,372 filed August 18, 1934.

In the apparatus of the accompanying drawings material to be treated is supplied from any suitable source of supply as, for example, the rotating mixing drum 10, to a supply chute or spout 11 and thence at intervals to a measuring chamber 12. Admission and discharge of the material to and from the measuring chamber 12 are controlled by the slide valves or gates 13 and 14, respectively, which are moved by fluid actuated pistons and cylinders 15 and 16, respectively, in such manner that one of the slides is in closed position while the other is in open position. When the slide 14 is closed, the slide 13 will therefore be open and the material will flow into the chamber 12 until it fills the latter. Thereupon the slide 13 closes and the slide 14 opens, discharging the material into a vacuumizing or gas chamber 17. With each opening and closing of the valve or slide 14, a measured quantity of material is supplied to the chamber 17.

After a measured quantity of material is supplied to the chamber 17, the slide 14 again closes to fill the chamber 12 with a subsequent measured quantity, and air is withdrawn from the chamber 17 through a pipe 18 until a high vacuum is obtained in the chamber 17 and throughout the mass of material therein. After the air has been withdrawn as completely as possible, selected gas is admitted through the pipe 18 and, if pressure packing is desired, the gas is filled under the required pressure. The selected gas may be withdrawn, carrying with it any traces of air, and may then be replaced by a fresh supply of the gas to remove the last traces of air. When the material has been thoroughly permeated with gas at the desired pressure, the gate 19 at the bottom of the chamber is opened by means of a fluid pressure cylinder and piston 20, and the material is discharged through a connecting opening into a bin which is also filled with the selected gas at the same pressure as the chamber 17.

Thereafter the gate 19 is closed, the selected gas withdrawn from the chamber 17 and returned to a storage therefor, either directly or through a purifier, and air is then admitted to the chamber 17 preparatory to the opening of the gate 14 and the discharge of the succeeding measured quantity of material into the gas or vacuum chamber 17. It is to be noted that when the gate 19 is open the material will fall from the chamber 17 into the bin 21 in a freely falling stream, while the air displaced by the material from the chamber 21 will flow in the opposite direction past the falling particles so that each of the latter will come into contact with and be enveloped in the gas while being filled into the bin. This ensures that every particle of material will be brought into contact with the gas and that the fullest opportunity will be afforded for contact of material with gas.

The material in the bin is then supplied to a number of individual weighing and filling devices of any suitable construction. In the embodiment illustrated in the drawings the weighing and filling mechanism shown in co-pending application Serial No. 740,738 is shown. The material is divided in spouts or chutes 22 (Fig. 3), twelve such spouts or chutes being shown by way of example. Each chute or spout is closed at its lower end by a closure 23 which is pivoted as at 24 to the side walls of the respective spouts in such manner that it may be swung alternatively to open and closed positions. When it is swung to open position, a stream of material is discharged through the opening and through a directing or guide chute 25 into weighing buckets 26, there being one bucket for each chute, each bucket being suspended from its individual weighing beam 27 (Fig. 2).

When the bucket 26 has been filled with a predetermined weight of material, it over-balances the counterweight 28 on the weighing beam and tilts the left arm of the beam downwardly. Thereupon an electro-magnetic apparatus controlled by a switch 29, preferably of the mercoid type, mounted above the fulcrum 30 of the weighing beam, closes the gate 23. In this manner each weighing bucket 26 is filled individually with a predetermined quantity or weight of material. After the material has been filled into the bucket 26 and the gate 23 closed, a pair of swinging gates 31 in the bottom of the bucket 26 are opened by an electro-magnet 32 controlled by a suitable control circuit to discharge the material into funnels 33. After an interval of time sufficient to permit the complete discharge of the material from the weighing bucket, the gates or closures 31 are swung to closed position by means of a counter-balancing weight 34.

As soon as material begins to be discharged into the funnels 33 from the respective buckets 26, it flows downwardly therethrough at a rate controlled by a pair of control cones 35 into spouts 36 which discharge into containers 37, one for each weighing bucket and funnel, within a filling chamber 38. The weighing mechanism, buckets and funnels are enclosed within an air tight chamber 39 so that the material is at all times maintained under suitable vacuum or in an atmosphere of the selected gas. Communication is provided between the filling chamber 38 and the enclosing chamber 39 by suitable openings 40 which permit the gas to flow upwardly into the chamber 39 as it is displaced from the chamber 38.

In passing downwardly into the weighing bucket 26 and from the latter through the cones 35 and spout 36 into the containers 37, each particle of material is again brought successively into intimate contact with the selected gas, affording successive opportunities for thorough permeation. The containers are supplied to the filling room 38 by the apparatus described in our co-pending application Serial No. 740,372. In this apparatus a number of containers are brought in single file on a conveyor belt 41 into aligned position before a gate 42 leading to a chamber 43. After being aligned in front of the gate 42, the latter is lowered by means of a fluid pressure operated apparatus 44 and the container is moved by means of a horizontal bar 45 carried at its ends on rock arms 46 on a rock shaft 47 immediately above and outside of the gate 42. The row of containers 37 is thus pushed sidewise into the chamber 43. The rock arms 46 are actuated through a linkage 47 from a fluid pressure apparatus 48. After the containers have been transferred to the chamber 43 and the rock arms 46 and bar 45 returned to their original positions, the gate 42 is closed. Thereupon air is withdrawn through a branch pipe 49 which is connected to the pipe 18 and leads to an exhaust and supply pipe 50.

The selected gas may then be admitted, filling the chamber 43 and containers 37. In the event that the last traces of air are to be removed, this gas may be withdrawn and the chamber again vacuumized, any remaining traces of air being thus carried out with the gas. The selected gas, free from air, may then be admitted until its pressure equals that in the chamber 38. Thereupon a gate 51 between the chamber 43 and the chamber 38 is lowered by means of a fluid pressure apparatus 52, and the row of containers 37 is pushed in a direction at right angles to their alignment into the chamber 37 and in position beneath their respective spouts 36 by means of a pusher bar 52 carried on the rock arms 53. The rock arms 53 and pusher bar 52 are then withdrawn to their original position and the gate 51 is lifted to closed position. The containers are then in position to be filled from their respective spouts 36 as described above.

During the filling of the containers 37 it is desirable to agitate them so as to shake the material as compactly as possible into the respective containers. A belt conveyor 54 on which the containers are placed is supported upon a shaking platform 55 (Fig. 3). The platform 55 is supported near its opposite ends on springs 56, and carries shafts 57 at the opposite ends which are eccentrically weighted as described in co-pending application Serial No. 740,738, or in other suitable manner, and are driven from a motor 58 through a belt 59 and chain 60. The platform 55 is also secured in longitudinal position by leaf springs 61 at opposite ends of the platform. The action of the eccentrically weighted shafts 57 is to shake the platform 55 vertically and with it the containers 37 beneath the funnels 33 and spouts 36 to pack the material into the containers as it is discharged from the spouts 36.

To prevent the containers being shaken out of position by the platform 55, a horizontal guide plate 62 is placed immediately above the upper edges of the containers and provided with suitable openings through which the spouts 36 extend as shown in Figs. 4 and 5. The plate 62 prevents the containers 37 from being thrown too high. They are prevented from moving sidewise by means of a tilting plate 63 having recesses 64 to receive and position containers. When the containers have been filled and are to be moved longitudinally of their direction of alignment to a sealing machine, the plate 63 is tilted to the position indicated in dotted lines in Fig. 4 by means of an electric solenoid 65 acting on a lever arm 66 of the plate.

The capacity of the measuring chamber 12 is substantially equal to the total quantity discharged by the group of weighing buckets at each cycle of operation, and is opened and closed once with each weighing cycle. Or it may have a capacity equal to two or more times the total capacity of the weighing buckets and, correspondingly, to be filled and opened with every two or proportionate number of weighing cycles.

It will be understood that the bin 21 is partly filled at all times, that the amount of material admitted thereto from the chamber 17 approximately equals the amount weighed therefrom with each cycle so that there is no accumulation or depletion of the amount of material in this bin over a period of time. It is advantageous, however, to keep the bin 21 partly filled so that slight variations in the feed or measurement of the material with reference to the quantity weighed may not interfere with the working of the apparatus due to a failure of material at one point or another.

It will also be evident that the gate 19 may be opened and closed with each weighing cycle. Preferably each of the gates 19, 14 and 13 operates in timed sequence with each weighing cycle. In this case the pneumatic or fluid pressure cylinder 20 and the cylinders 15 and 16 actuating the gates 13 and 14 may be connected to and actuated simultaneously with the fluid pressure cylinders 44 and 52. The gate 19 will be opened and closed simultaneously with the gate 51, and the gate 14 will be opened and closed simultaneously with the gate 42 so that the chamber 17 and the chamber 43 will be open to the atmosphere, closed from both atmosphere and filling chamber and open to the filling chamber at the same time and so that, therefore, the exhaustion of air and replacement of gas may take place at the same time or in the same cycles for both the chamber 43 and the chamber 17. For this purpose a pipe 67 connects the bottom part of the fluid pressure cylinder 52 with the pipe system 68 leading to the left hand end of the cylinder 16, and the pipe 69 connects the upper end of the cylinder 52 to a pipe system 70 leading to the right hand end of the cylinder 16. The pipes 68 and 70 lead to the opposite ends of the cylinder 15 to operate the gate 14 directly opposite to the gate 13. Similarly, the lower end of the cylinder 44 is connected by a pipe 71 to the left end of the cylinder 20, and a pipe 72 connects the upper end of the cylinder 44 to the right end of the cylinder 20 so that the gate 42 will close and open simultaneously with the gate 19.

The admission and exhaust of pressure fluid to the various cylinders 44, 52, 20, 16 and 15 is controlled by master valves 73 rotated by a control shaft 74 connected to the capping or closing machine as described in co-pending application Serial No. 740,372. This shaft 74 also controls the time of the weighing buckets and of the positioning plate 63.

One of the master valves 73 controls the withdrawal of air from the various cylinders 44, 52, 20, 16 and 15 by an exhaust pump or similar means 73'. Whereas the other valve 73 controls the admission of selected gas to the pipe 50 from a suitable gasometer 73.

Referring to the wiring diagram shown in Fig. 4, electric solenoids 75 for opening and locking the gates 23 are energized by a circuit in series with the mercoid switches 29 on the weighing beams 27, there being one solenoid for each gate 23 and for each weighing beam. The solenoid 75 is also in series with a mercoid switch 76 mounted on a rocking lever 77 which is rocked by means of a cam 78 on the shaft 74. The cam 78 raises the lever 77 and tilts the mercoid switch 76 in a direction opposite to that shown in Fig. 4 when a part of the periphery 79 of greater diameter comes under the lever 77. When the lever 77 is thus lifted and the weighing arm 27 is tilted counter-clockwise by the weighing buckets 26, current is interrupted, the solenoid 75 is de-energized and the gate 23 is closed by the spring 80 (Fig. 2). When, however, the bucket 26 has emptied and the weighing beam 27 has moved clockwise, and the beam 77 is in the position shown in Fig. 4, current flows from a main 81 through a branch line 82 and connecting wire 83 to the mercoid switch 76, thence through a conductor 84 to the solenoid 75, through a connecting wire 85 to the mercoid switch 27, thence through connecting wire 86 to a return wire 87 leading to the return main 88.

Thereupon the solenoid 75 is energized and the gate 23 is drawn to open position and the material is discharged into the weighing bucket until the latter again tilts to the position shown in Fig. 4, breaking the circuit at the mercoid switch 29 to de-energize the solenoid 75 and permit the spring 80 to close the gate 23.

The solenoids 32 of the respective weighing buckets 26 are energized to open the gates 31 when the weighing arm 27 is in the position shown in Fig. 4, and when the mercoid switch 76 is in the opposite position from that shown in Fig. 4. Thereupon current flows from the conductor 87 through a branch wire 89 to the mercoid switch 29, thence through branch line 90 to the electro-magnet 32, thence through the conductor 91 to the mercoid switch 76. From the latter it flows through a branch connector 92 to the wire 82 and main 81. As soon as the bucket begins to empty and the weighing arm 27 tilts in a clockwise direction, the mercoid switch 29 will break the circuit between the conductors 89 and 90. Meanwhile, however, the armature of the electro-magnet 32 has closed a by-pass circuit through a switch 93 between the conductors 90 and 87, thereby by-passing the mercoid switch 75

29 and maintaining and energizing the circuit through the solenoid 32 until the circuit is broken by the tilting of the mercoid switch 76.

The electro-magnet 65 is energized and de-energized at timed intervals by a pin 94 on the cam 78 which, with each cycle, engages a lever arm 95 on which is mounted a mercoid switch 96 connecting the conductor 82 through a branch wire 97 to a return conductor 98 leading to one terminal of the electro-magnet 65, the opposite terminal of which is connected by a conductor 99 and the wire 87 to the main 88. The pin 94 is so positioned as to depress the lever 95 and close the mercoid switch 96 for a short interval while the traveling conveyor belt 54 conveys the containers 37 from their position beneath the weighing buckets 26 and spouts 36 lengthwise of the alignment of the containers to a capping or sealing machine. Immediately thereafter the circuit is broken through the mercoid switch 96, permitting the plate 63 to tilt to the full line position of Fig. 4.

From the above wiring diagram it will be apparent that the discharge of material from the spout 21 to the weighing buckets takes place at regularly timed intervals controlled by the control shaft 74, provided the buckets are in their raised position, that the buckets discharge as soon as they have received a weight of material determined by the position of the weight 28 on the weighing beam 27, and that the buckets are closed at a definite time interval, this time interval being sufficient to permit complete discharge of the material. The cones 35 in the funnel 33 regulate the discharge of material into the containers 37, and this rate of discharge may be slower than the discharge from the buckets.

Through the above invention, therefore, a quantity of material sufficient for one filling of all of the weighing buckets is cyclically admitted from the measuring chamber 12 to the vacuumizing chamber 17. In the latter, air is withdrawn completely and, if the material is to be packed under a selected gas, the selected gas is admitted to the chamber 17 and permitted to permeate the material therein. The material under vacuum or in the selected gas atmosphere then discharges into the bin 21 which is either under vacuum or is filled with a selected gas. The weighing takes place in the chamber 39 which is also either under vacuum or filled with a selected gas and in communication with the weighing chamber or room 38. As the material falls in a freely flowing stream from the chamber 17 into the bin and into the weighing buckets, and thence through the funnel 33 into the container, the particles are successively agitated and passed through the selected gas atmosphere in case packing is to take place in a selected gas. Also, the particles of material fall into a container already filled with the selected gas. This ensures that the penetration of gas shall be thorough throughout the material in the container. The vacuumizing of several containers in a group and of the material in bulk and its successive contact with vacuum or selected gas enables substantially all of the air to be removed and replaced with the selected gas.

Inasmuch as a large number of containers may thus be filled simultaneously, the period of treatment may be prolonged in order to obtain thorough treatment without cutting down the number of containers that may be filled in a given time, or with an increase in the number vacuumized and filled. The period of treatment may be made independent of the capacity by suitably varying the number treated in a single group.

Also, by successive vacuumizing and replacing with selected gas, even the last traces of air or oxygen may be substantially removed. For example, if the vacuum is carried to any given extent, for example 1/100th of an atmosphere, and selected gas is admitted to full atmospheric pressure, the partial pressure of the air will still be only 1/100th of an atmosphere. If then the selected gas be again withdrawn until the total pressure is 1/100th of an atmosphere, the air will be withdrawn in like proportion so that the partial pressure, after the second vacuumization, will be only 1/10000th of an atmosphere. By successive withdrawals the quantity of air or oxygen may be reduced to an infinitesimal amount.

What we claim is:

1. A method for filling containers with a weighed quantity of material under selected gaseous conditions which comprises withdrawing air from a container, measuring a quantity of material, withdrawing air from said measured quantity of material, and filling a predetermined weight of said material into said container.

2. A method for filling containers with materials under a selected gas which comprises removing air from a container and replacing it with a selected gas, withdrawing air from a measured quantity of material and replacing it with gas, weighing a predetermined weight of said material in said selected gas atmosphere, and filling said predetermined weight of material into said container.

3. A method for filling containers with material under selected gaseous conditions which comprises removing air from a group of containers, measuring a quantity of material sufficient to fill said containers, withdrawing air from said measured quantity of material, weighing said material into predetermined weights, one for each container of said group, and filling said weighed quantities into their respective containers.

4. A method for filling a group of containers with material under a selected gas which comprises removing air from a group of containers and replacing it with a selected gas, measuring a quantity of material sufficient to fill the containers of said group, withdrawing air from said measured quantity of material and replacing it with the selected gas, weighing said material in said selected gas into quantities of predetermined weight, and filling said quantities into respective containers of said group in said selected atmosphere.

5. A method of filling containers which comprises cyclically withdrawing air from a group of containers and from a measured quantity of material at approximately coinciding intervals, then moving said group of containers to positions to receive material, weighing and vacuumizing material into lots of predetermined weight, one for each container of said group, and filling the respective containers with said lots.

6. A method of filling containers with weighed quantities of material in a selected gas which comprises exhausting air from a group of containers and from a measured quantity of material, replacing said air with a selected gas, then moving said containers into position to receive weighed material, weighing said material in said selected gas into quantities of predetermined weights, one for each container of said group, and putting said quantities into their respective containers while in said selected gas.

7. A method of filling a container with material in an atmosphere of a selected gas which comprises exhausting air from said container and replacing it with said selected gas, exhausting air from a quantity of material and replacing it with a selected gas, dropping said material in a flowing stream through said selected gas, and filling a weighed quantity of said material into said container.

8. A method of filling containers with material in a selected gas atmosphere which comprises exhausting air from a group of containers and replacing said air with a selected gas, exhausting air from a measured quantity of material sufficient to fill said containers and replacing said exhausted air with a selected gas, dropping said material in flowing streams into weighed quantities, one for each container of said group, and then flowing said weighed quantities through said selected gas into their respective containers.

9. Apparatus for filling containers which comprises means for measuring a quantity of material, means for withdrawing air from said measured quantity of material and from a number of containers, means for weighing said material after withdrawal of air therefrom into predetermined weights and means for filling weighed quantities of said material into said containers.

10. Apparatus for filling containers with material which comprises means for measuring a quantity of material, means for withdrawing air from said measured quantity of material and from said containers and admitting a selected gas thereto, means for weighing said material in said selected gas into predetermined weights, and means for filling said weighed quantities into said containers in said selected gas.

11. Apparatus for filling containers which comprises a measuring chamber, a vacuumizing chamber into which said measuring chamber discharges, means through which air may be withdrawn from and admitted to said vacuumizing chamber from and to a group of containers, a storage bin sealed from the atmosphere and communicating with said vacuumizing chamber to receive material therefrom when free from air, means to weigh material from said bin into predetermined quantities out of contact with air and means for feeding said weighed quantities into said containers while excluding air therefrom.

12. Apparatus for filling containers with material in a selected gas atmosphere which comprises a measuring chamber, a vacuumizing and gassing chamber into which said measuring chamber discharges, means to withdraw air from said vacuumizing chamber and from a group of containers and to replace it with a selected gas, a storage bin sealed from the atmosphere and communicating with said vacuumizing and gassing chamber to receive material therefrom when filled with said selected gas, means to weigh material from said bin into predetermined quantities in said selected gas, and means for feeding said weighed quantities into said respective containers in said selected gas.

13. Apparatus for filling containers in a selected gas which comprises a measuring chamber, a vacuumizing and gassing chamber into which said measuring chamber discharges, a storage bin sealed from the atmosphere and communicating with said vacuumizing and gassing chamber to receive material therefrom when free from air, means through which air may be withdrawn from a group of containers and from said vacuumizing and gassing chamber and be replaced by a selected gas, cyclically timed means to weigh material from said bin into predetermined quantities in said selected gas, and means for feeding said weighed quantities into containers in said selected gas.

14. Apparatus for filling containers under selected gaseous conditions which comprises a measuring chamber, a vacuumizing chamber to receive material from said measuring chamber, means through which air may be withdrawn from successive groups of containers and from said vacuumizing chamber, cyclically acting weighing means to weigh a predetermined quantity of material from said vacuumizing chamber to each container of said successive groups and to feed material to the respective containers from which air has been withdrawn.

15. Apparatus for filling containers with material in a selected gas atmosphere which comprises a filling room sealed from the atmosphere, means to withdraw air from a group of containers and replace it with a selected gas and to position said containers in said filling room, a weighing room above said filling room and in free communication therewith, a gassing chamber above said weighing room and a measuring chamber above said gassing chamber, means timed cyclically with the withdrawal of air and positioning of said containers to measure a quantity of material in said weighing room, to connect said gassing room with said air withdrawal and gas replacement means whereby said weighing room is evacuated and replenished with selected gas, to weigh material from said gassing room in said weighing room, and to discharge said weighed quantities of material from said weighing room into respective containers while in free contact with said selected gas.

16. Apparatus for filling containers with material under selected gaseous conditions which comprises a filling room, an entrance chamber to said filling room, a vacuumizing room for material to be filled to said containers, a gate for discharge of material from said gassing room for filling into containers, an entrance gate to said vacuumizing room, an outer gate between atmosphere and said entrance chamber and an inner gate between said entrance chamber and said filling room, means to operate said discharge gate and said inner gate simultaneously, and means to operate said outer gate and said entrance gate simultaneously.

17. Apparatus for filling containers with material under selected gaseous conditions which comprises a filling room, a shaking mechanism in said filling room, means to move containers in one direction onto said shaking means and to remove them in a direction at an angle to their entrance, means for holding said containers in position on said shaking means which comprises separators engaging opposite sides of said containers, and timed means to move said separators out of engaging position.

WILLIAM MILES RYAN.
JOHN W. BOLD.